Oct. 3, 1939.  A. L. LANGEL  2,174,703
MULTIPLE PAN
Filed June 5, 1938  2 Sheets-Sheet 1
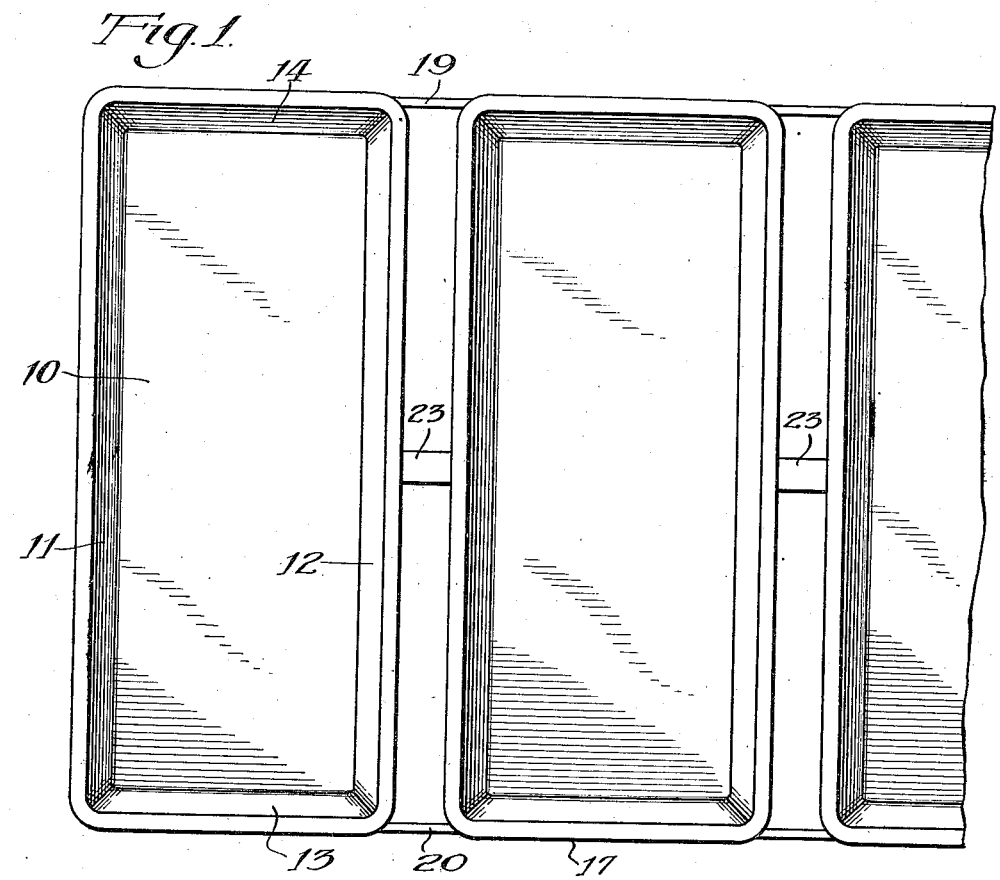
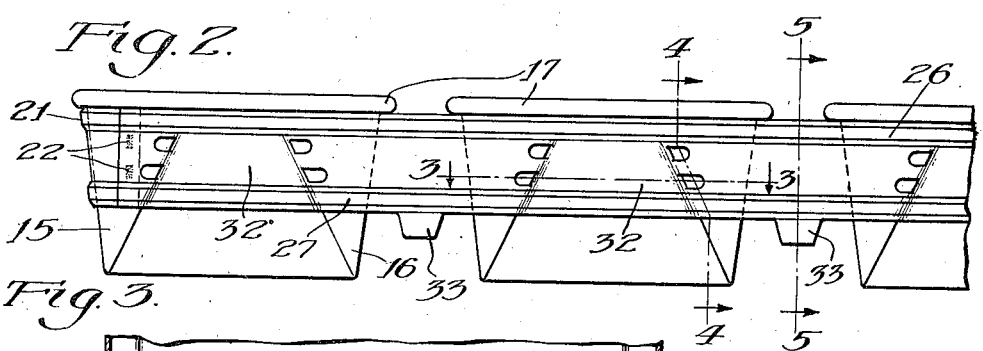
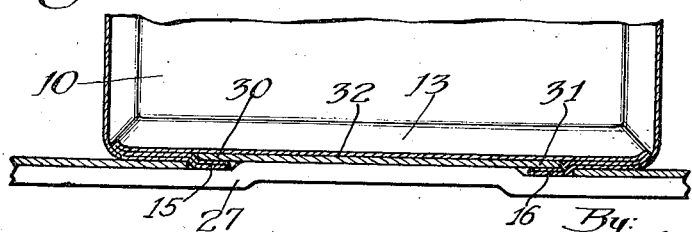
Inventor:
Adrien L. Langel
By Zabel, Carlson, Gritzbaugh & Wells
Attorneys Oct. 3, 1939. A. L. LANGEL 2,174,703
MULTIPLE PAN
Filed June 5, 1938 2 Sheets-Sheet 2
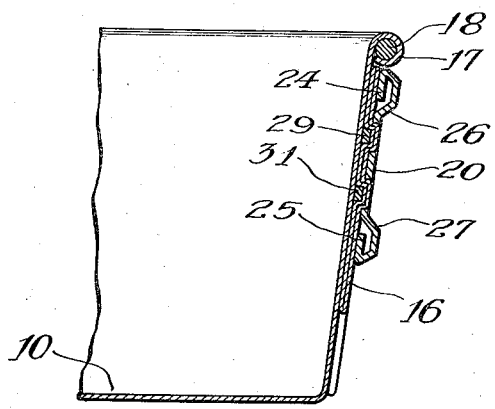
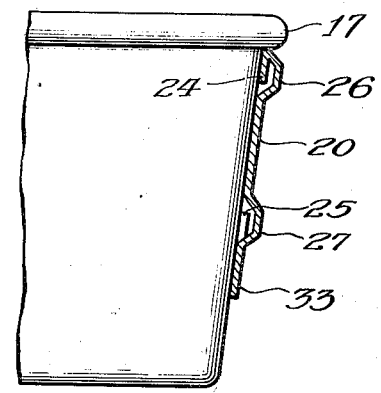
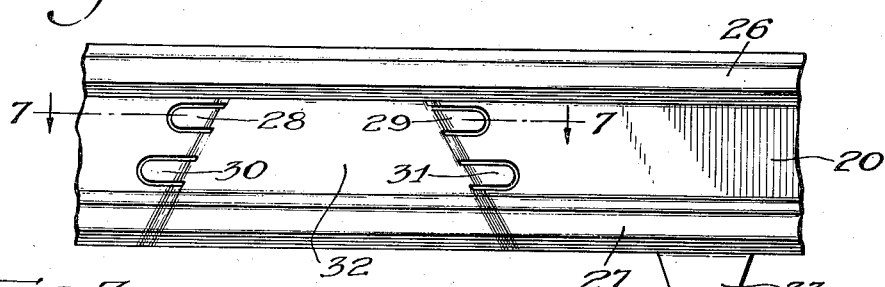
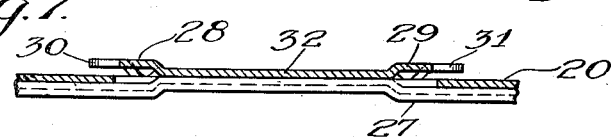
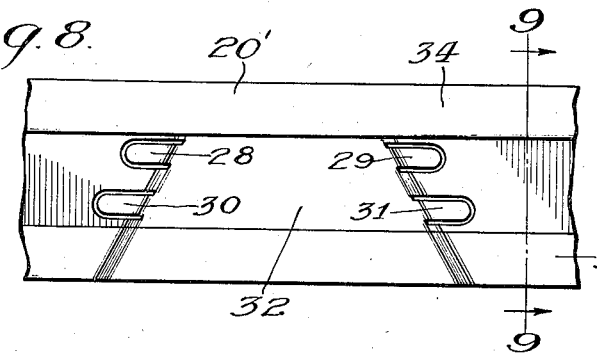
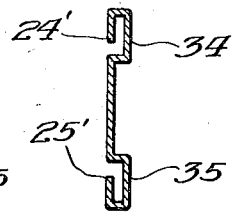
Inventor:
Adrien L. Langel,
By: Zabel, Carlson, Gritzbaugh & Wells
Attorney.

Patented Oct. 3, 1939

2,174,703

UNITED STATES PATENT OFFICE 2,174,703

MULTIPLE PAN

Adrien L. Langel, Chicago, Ill., assignor to Chicago Metallic Manufacturing Company, Chicago, Ill., a corporation of Illinois Application January 5, 1938, Serial No. 183,486

3 Claims. (Cl. 53—6)

The present invention relates to baking pans of the multiple type, in which a plurality of metal receptacles such as bread pans are connected together by means of a metal framework, so that the plurality of receptacles may be handled as a single unit. The invention is embodied in a multiple pan of the type described, wherein a plurality of receptacles are connected together by means of end bars which are interlocked with the end portions of the receptacles in spaced relation. The opposite ends of the multiple pan assembly are protected by protector plates which are welded to the end bars to provide a complete rectangular frame about the receptacles. The receptacles may be connected intermediate their ends by cross ties such as are known in the art. The present invention provides, in a multiple pan structure of the character described, a novel means whereby the end bars and the receptacles are interlocked to form a rigid unit.

The multiple pan structure embodying the present invention includes a novel end bar construction which gives adequate strength with a very light metal strip.

The features and advantages of the invention will appear more readily as the description proceeds, reference being had to the accompanying drawings wherein a preferred form of the invention is shown.

In the drawings:

Fig. 1 is a fragmentary plan view of a multiple pan embodying the invention;

Fig. 2 is a view in side elevation looking at the ends of the receptacles;

Fig. 3 is an enlarged sectional view on the line 3—3 of Fig. 2;

Fig. 4 is an enlarged sectional view on the line 4—4 of Fig. 2;

Fig. 5 is an enlarged sectional view upon the line 5—5 of Fig. 2;

Fig. 6 is a view in side elevation of a portion of the end bar;

Fig. 7 is a sectional view taken on the line 7—7 of Fig. 6;

Fig. 8 is a view similar to Fig. 6 showing a modified form of the end bar, and

Fig. 9 is a sectional view on the line 9—9 of Fig. 8.

Referring now to the drawings, the invention is embodied in a multiple pan which is made up of a plurality of receptacles 10. These receptacles are rectangular in form, having side panels 11 and 12 and end panels 13 and 14. In forming the receptacles, the side panels and end panels are bent up from a flat sheet, the excess material at the corners being taken up in folded sections 15 and 16 which are folded over the end panels such as 13 in the manner shown in Figs. 2 and 3. The receptacles 10 have top edge portions 17 which are curled around reinforcing wires 18.

The several receptacles 10 are secured together by a framework which is composed of a pair of end bars 19 and 20 and protector plates 21. The end bars 19 and 20 are interlocked individually with the several receptacles and are welded to the protector plates 21 as shown at 22 in Fig. 2. The receptacles 10 are connected to each other by cross ties 23 which are fixed to the adjacent receptacles in the usual manner.

The present invention concerns itself primarily with improvements in the end bar construction and the connection between the end bars and the receptacles. Each end bar is preferably composed of a metal strip which, as shown best in Figs. 4, 5, and 6, has its upper and lower edges 24 and 25 folded back so as to extend directly toward each other. The end bar is provided with offset portions 26 and 27 so as to provide longitudinally extending ribs at the upper and lower edges of the end bars. Opposite each end panel of the receptacles 10 the end bars are provided with a plurality of fingers 28, 29, 30 and 31. The fingers 28 and 29 constitute one pair of oppositely directed fingers, and the fingers 30 and 31 constitute a similar pair of fingers spaced below the first mentioned pair. All of the fingers 28, 29, 30 and 31 are struck out of that portion of the end bar lying between the ribs 26 and 27. The end bar is offset inwardly against the end panel of the adjacent receptacle 10 to provide a portion 32 that lies directly against the end panel of the receptacle. This offset portion 32 is shaped to fit between the folded over sections 15 and 16, and the fingers 28, 29, 30 and 31 begin at the edges of the offset portion 32. The fingers are initially offset inwardly beyond the portion 32 so that the fingers may be inserted beneath the folded over sections 15 and 16. To complete the interlocking of the receptacles with the end bars, pressure is applied to force the portions of the folded over sections that lie directly on the fingers 28, 29, 30 and 31 into the openings in the end bars from which the fingers were punched out, such pressure serving to crimp the edge portions of the folded sections so as to have holding engagement with both the body portions and the fingers of the end bars. This feature of the construction is shown best in Figs. 3 and 4.

In this construction, the offset portions 32 provide upwardly converging shoulders which engage the correspondingly angled edges of the folded over sections 15 and 16 of the pans, and the parts are held firmly in this wedging relationship by the succession of mutually reinforcing shoulders at opposite sides of the fingers. The presence of the obliquely positioned shoulders across the end bars and of the longitudinally extending ribs 26 and 27 closely adjacent to the fingers gives the parts a high degree of stiffness and strength by which the end bars are held very strongly against movement with respect to the receptacles.

The end bars 19 and 20 have depending lugs 33 between the several receptacles. These lugs are utilized as means to position the multiple pan unit upon a subjacent unit. The lugs 33 are formed integrally with the end bars, being cut out from a portion of the end bar strip and left extending parallel to the main portion of the strip when the edge 25 is folded over.

In Figs. 8 and 9 a slightly modified construction of end bar is shown. In this form, the end bar 20' has ribs 34 and 35 which are formed by offsetting the metal of the strip at right angles to the main body portion thereof instead of in a bevelled fashion, as in Figs. 1 to 7. The construction otherwise is the same as in the main form of the invention.

While certain embodiments of the invention have been shown and described, it is to be understood that it is capable of many modifications. Changes, therefore, in the construction and arrangement may be made without departing from the spirit and scope of the invention as disclosed in the appended claims in which it is the intention to claim all novelty inherent in the invention as broadly as possible in view of the prior art.

Having thus described the invention, what I claim as new and desire to secure by Letters Patent is:

1. A multiple pan comprising a plurality of spaced receptacles, end bars fixed to the ends of said receptacles, said receptacles having folded sections overlying the end panels thereof and said end bars having upper and lower pairs of oppositely directed fingers struck out therefrom and interposed between the end panels and their folded sections, said folded sections being offset into the openings in the end bars from which the fingers are struck out, said end bars having portions thereof between the fingers of the pairs offset inwardly to lie against the end panels of the receptacles.

2. In a multiple pan unit, the combination of a plurality of pans arranged side by side and each having folded sections at the corners overlying the end panel of the pan, end bars extending across the ends of said pans and having shoulders pressed therein across the bars opposite the edges of said folded sections and having reinforcing ribs longitudinally thereof extending at least from one of said shoulders to the other for stiffening the bars, and oppositely directed fingers struck from said end bars closely adjacent to said longitudinally extending ribs and extending between said folded sections and the adjacent end panels, said folded sections being crimped into holding engagement with both the fingers and the body portions of said end bars.

3. In a multiple pan unit, the combination of a plurality of pans arranged side by side and each having folded sections at the corners overlying the end panel of the pan with their adjacent edges extending in upwardly convergent position with respect to each other, end bars extending across the ends of said pans with portions offset inwardly opposite each of the pans providing shoulders across the bars having a snug wedging fit between the converging edges of said folded sections and with reinforcing ribs pressed in the bars along their top and bottom edges and extending at least from one of said shoulders to the other at each of said offset portions for stiffening the bars, and means for securing said end bars firmly in such wedging position on said pans comprising at least two fingers on the end bar at each side of said offset portions extending into position between the folded sections and the end panel of the pan and held against vertical movement with respect to the pan by engagement with shoulders in said folded sections both above and below each of said fingers, said fingers being located closely adjacent to said cross shoulders of said end bars and closely adjacent to said longitudinally extending ribs so as to be substantially reinforced in position thereby.

ADRIEN L. LANGEL.